(12) United States Patent
Pharris

(10) Patent No.: US 7,738,736 B2
(45) Date of Patent: Jun. 15, 2010

(54) METHODS AND SYSTEMS FOR HOLOGRAPHIC DATA RECOVERY

(75) Inventor: Kenton J. Pharris, Longmont, CO (US)

(73) Assignee: InPhase Technologies, Inc., Longmont, CO (US)

( * ) Notice: Subject to any disclaimer, the term of this patent is extended or adjusted under 35 U.S.C. 154(b) by 699 days.

(21) Appl. No.: 10/841,102

(22) Filed: May 6, 2004

(65) Prior Publication Data

US 2005/0018263 A1 Jan. 27, 2005

Related U.S. Application Data

(60) Provisional application No. 60/469,574, filed on May 9, 2003.

(51) Int. Cl.
G06K 9/32 (2006.01)
(52) U.S. Cl. .................. 382/298; 382/210; 382/211; 359/13; 359/22; 359/32
(58) Field of Classification Search ........... 382/210, 382/211, 298; 359/13, 22, 32
See application file for complete search history.

(56) References Cited

U.S. PATENT DOCUMENTS

| | | | |
|---|---|---|---|
| 4,866,647 A | 9/1989 | Farrow | |
| 5,251,313 A | 10/1993 | Spenik et al. | |
| 5,694,488 A * | 12/1997 | Hartmann | ............. 382/210 |
| 5,719,691 A | 2/1998 | Curtis et al. | |
| 5,920,536 A | 7/1999 | Campbell et al. | |
| 5,940,537 A * | 8/1999 | Regen et al. | ............. 382/210 |
| 5,982,513 A | 11/1999 | Zhou et al. | |
| 6,031,643 A | 2/2000 | Burr | |
| 6,175,543 B1 | 1/2001 | Burr et al. | |
| 6,191,875 B1 | 2/2001 | Curtis et al. | |
| 6,205,107 B1 | 3/2001 | Burr | |
| 6,414,296 B1 * | 7/2002 | Edwards | ............. 250/208.1 |
| 6,526,538 B1 | 2/2003 | Hewitt | |
| 6,697,316 B2 * | 2/2004 | Burr | ............. 369/103 |
| 2002/0172131 A1 | 11/2002 | Burr | |

OTHER PUBLICATIONS

Valimaki et al., "Fractional Delay Digital Filters", IEEE International Symposium, May 3-6, 1993, 355-358.*
Valimaki and Laakso; "Principles of Fractional Delay Filters"; IEEE ICASSP'00, Jun. 5-9, 2000, pp. 3870-3873. vol. 6.*

(Continued)

Primary Examiner—Vikkram Bali
Assistant Examiner—Eueng-Nan Yeh
(74) Attorney, Agent, or Firm—Morrison & Foerster LLP

(57) ABSTRACT

A method for holographic storage data recovery in a holographic storage system is presented. One exemplary method includes detecting a stored image at a detector such that the image is oversampled. A relationship is determined between a location of the detected image and a location of the source image. Pixel information associated with the source image may be obtained from the detected image based on a fractional delay filter. In one example, the image may be oversampled by magnifying the detected image at the detector and/or having a detector with pixel sizes and spacing less than the image pixel size. Further, coefficients of the fractional delay filter may be determined, at least in part, on magnification and shift information of the image based on known registration marks.

30 Claims, 11 Drawing Sheets

OTHER PUBLICATIONS

C. Tseng; "Eigenfilter approach for the design of variable fractional delay FIR and all-pass filters"; Vision, Image and Signal Processing, IEE proceedings, vol. 149, Issue 5, Oct. 2002 pp. 297-303.*

Author Unknown (Dec. 2003). *Data Interchange on 120 mm and 80mm Optical Disk Using +RW Format—Capacity: 4, 7 and 1,46 Gbytes per Side, Recording Speed up to 4X* provided by ECMA International Standardizing Information and Communication System, Standard ECMA-337, $2^{nd}$ Edition (Includes Table of Contents).

Burr, G. W. (Apr. 1, 2002). "Holographic Data Storage with Arbitrarily Misaligned Data Pages," *Optics Letters* 27(7):542-544.

Burr, G. W. et al. (Apr. 15, 2001). "Compensation for Pixel Misregistration in Volume Holographic Data Storage," *Optics Letters* 26(8):542-544.

Criminisi, A. et al. (May 6, 2003). "Academic: Perspective Transform Estimation," located at <http://xenia.media.mit.edu>, last visited on May 6, 2003, 6 pages.

Johansson, H. et al. (Aug. 28-31, 2001). "On Adjustable Fractional Delay FIR Filters and Their Design," *ECCTD'01—European Conference on Circuit Theory and Design,* 4 pages.

Roth, R. M. et al. (1999). "Efficient Coding for a Two-Dimensional Runlength-Limited Constraint," *Proceedings of the SPIE—Int. Soc. Opt. Eng. USA* 3802:8-17, Nov. 1999.

U.S. Appl. No. 10/305,769, filed Nov. 27, 2002, Curtis et al.

* cited by examiner

| row | 715 | 716 | 717 | 718 | 719 | 720 | 721 | 722 | 723 | 724 | 725 | 726 | 727 | 728 | 729 | 730 |
|---|---|---|---|---|---|---|---|---|---|---|---|---|---|---|---|---|
| 514 | 15 | -32 | -16 | -3 | -1 | 0 | 1 | 0 | 1 | 1 | 1 | 3 | 5 | 2 | 1 | 2 |
| 515 | 12 | -13 | -7 | -1 | 1 | 3 | 2 | 0 | 1 | 0 | 0 | 1 | 1 | 2 | 0 | 0 |
| 516 | -1 | -4 | -4 | -2 | 0 | -2 | 1 | 0 | 0 | 0 | 1 | 2 | 0 | 0 | 0 | 0 |
| 517 | 0 | -1 | -2 | -1 | -1 | -1 | 0 | -3 | 1 | 0 | -4 | -2 | -2 | -1 | -1 | -1 |
| 518 | 3 | 2 | 1 | -1 | 1 | 1 | -7 | -11 | 6 | -2 | -10 | -5 | -2 | -1 | -1 | 0 |
| 519 | 1 | 1 | -1 | -2 | -3 | -4 | -7 | -18 | 14 | 1 | -14 | -7 | -3 | -2 | -1 | -1 |
| 520 | -2 | 0 | -2 | -2 | -7 | -13 | 0 | -15 | 16 | 7 | -11 | -10 | -8 | -3 | 0 | 0 |
| 521 | 0 | 1 | -1 | 0 | -2 | -8 | 2 | -5 | 42 | 21 | -4 | -5 | -4 | -1 | -1 | -1 |
| 522 | 2 | 1 | -2 | 1 | 7 | 12 | 15 | 12 | 83 | 48 | 8 | 8 | 8 | 3 | 1 | 0 |
| 523 | -0 | 0 | -1 | -2 | -7 | -11 | 4 | -5 | 36 | 20 | -2 | -6 | -7 | -3 | 1 | -1 |
| 524 | 0 | 2 | 2 | 0 | -8 | -11 | -4 | -13 | 19 | 6 | -11 | -10 | -7 | -4 | -1 | 0 |
| 525 | 2 | 2 | 0 | 2 | 0 | -5 | -13 | -21 | 13 | -5 | -20 | -11 | -3 | -2 | -1 | -1 |
| 526 | 1 | -2 | -1 | -1 | -1 | -2 | -6 | -8 | 6 | -2 | -6 | -3 | -1 | -1 | 1 | -1 |
| 527 | -1 | -1 | 0 | -2 | -1 | 1 | 0 | -2 | 2 | -1 | 0 | 2 | 2 | 0 | 1 | 2 |
| 528 | 2 | 3 | 1 | -0 | 1 | 1 | -1 | -2 | 1 | -1 | -2 | -1 | 1 | -3 | 2 | 2 |
| 529 | -0 | -2 | -0 | -0 | 1 | 0 | -0 | -0 | 1 | -1 | 0 | -1 | -1 | -1 | -0 | 1 | centroid=83.0 at [521.97,723.16]

Figure 4

METHODS AND SYSTEMS FOR HOLOGRAPHIC DATA RECOVERY

CROSS REFERENCE TO RELATED APPLICATION

The present application claims benefit of earlier filed provisional patent application, U.S. Application No. 60/469,574, filed on May 9, 2003, and entitled "METHODS AND SYSTEMS FOR HOLOGRAPHIC DATA RECOVERY," which is hereby incorporated by reference as if fully set forth herein.

BACKGROUND

1. Field of the Invention

The invention relates generally to holographic data storage methods and systems, and more particularly to methods and systems for holographic data storage recovery by oversampling and fractional-delay filter interpolation.

2. Description of the Related Art

Holographic data storage systems store information or data based on the concept of a signal beam interfering with a reference beam at a holographic storage medium. The interference of the signal beam and the reference beam creates a holographic representation, i.e., a hologram, of data elements as a pattern of varying refractive index and/or absorption imprinted in a volume of a storage or recording medium such as a photopolymer or photorefractive crystal. A spatial light modulator (SLM), for example, can create the data-encoded signal beam. The interference pattern induces material alterations in the storage medium that generate the hologram. The formation of the hologram in the storage medium is a function of the relative amplitudes and polarization states of, and phase differences between, the signal beam and the reference beam. The hologram is also dependent on the wavelengths and angles at which the signal beam and the reference beam are projected into the storage medium. After a hologram is created in the storage medium, projecting the reference beam into the storage medium interacts and reconstructs the original data-encoded signal beam. The reconstructed signal beam may be detected by using a detector, such as CMOS photodetector array or the like. The recovered data may then be decoded by the photo-detector array into the original encoded data.

In typical holographic data storage systems it is important to align the SLM, detector (i.e., a camera), and the data storage medium such that each pixel of the SLM is projected onto a single pixel of the detector. This alignment is desired for a single hologram or a group of holograms stored by various multiplexing methods including angle, shift, wavelength, correlation, spatial, aperture, phase code, and the like. Aligning the pixels of the SLM, stored holographic image, and detector is commonly referred to as "pixel matching." One objective of pixel matching is to obtain recovered images of data-containing holograms on the detector that have a low number of bits decoded in error in relation to the total bits of the data page, i.e., a low bit error rate (BER).

Performance of a holographic storage system, i.e., the quality of the modulated image, therefore depends at least in part on the alignment of various components such as the SLM with various devices, such as light sources, lenses, detectors, the storage medium, and the like. Generally the position and alignment of the SLM and other device components for reading and writing to the storage medium are mechanically set at the time of manufacturing the holographic storage system. Over time, however, the SLM, detector, or storage medium may become misaligned with various other components of the particular system. For example, temperature change, vibration, shock, and the like may result in slight movements or deformations of the detector, SLM, storage medium, or other optical components. The result may be translational, tilt, or rotational misalignment of the detector with the storage medium or the SLM. Further, in systems with removable storage media, such as a rotating disk or rectangular storage media, the media may be misaligned when inserted into one or more systems for read and/or write operations.

The desired alignment of components in a holographic storage system in the x and y direction is typically on the order of a few microns or less, and the rotation better than approximately 0.001 degree. In addition, the magnification of the system from drive to drive is desirably maintained to a high degree (typically better than 0.01%). The desired magnification generally results in the effective focal length of the lens between different drives to match on the order of tens of micron level. Such matching is difficult to achieve in low cost high volume processes. For example, these constraints on pixel matching may result in a holographic drive system generally having a higher cost, larger size, with increased error rates, and lower storage capacity than otherwise possible.

One strategy proposed for correcting errors arising from pixel misalignment due to improperly positioned system components and the like is to apply image-processing techniques to the recovered hologram image. An example of such a method is described in "Compensation for Pixel Misregistration in Volume Holographic Data Storage," by G. W. Burr and T. Weiss published in Optics Letters, Vol. 26, No. 8, Apr. 15, 2001, the entire contents of which is incorporated herein by reference. Another approach is to adjust or tilt the reference beam to realign the image onto the detector during a read out process. Such a method is described in U.S. Pat. No. 5,982,513 entitled "Method and System to Align Holographic Images," the entire content of which is incorporated herein by reference.

Deficiencies of these and other various methods include, for example, that system parameters are generally known or determined very precisely. Some image processing techniques are computationally intensive, may require repeated iterations to converge, suffer from error propagation, and may require channel transfer characteristics, i.e., point spread functions as it varies over the image. Additionally, there is no soft decision information as used by some error correction codes, for example, turbo codes and Low Density Parity Check (LDPC) codes.

New methods and devices are therefore needed for reliably adjusting for pixel misalignments and recovering holographic stored data with reduced error rates. In particular, methods and systems for processing detected holographic images with misalignments are needed.

BRIEF SUMMARY

In one aspect of the invention, a method for holographic storage data recovery in a holographic storage system is described. One exemplary method includes detecting a stored image at a detector such that the image is oversampled. A relationship is determined between a location of the detected image and a location of the source image. Pixel information associated with the source image may be obtained from the detected image based on a fractional delay filter. In one example, the image may be oversampled by magnifying the detected image at the detector and/or having a detector with pixel spacing and pixel sizes less than the image pixel size. Further, coefficients of the fractional delay filter may be determined, at least in part, on magnification and shift of the image based on known registration marks.

In another aspect of the invention, a holographic storage system includes a method for holographic data recovery. The method includes detecting an image of a source image, where the detected image is oversampled. Pixel information associated with the source image is obtained based on a sample rate conversion. In one example, the sample rate conversion includes a fractional delay filter.

In another aspect of the invention, a holographic storage system includes an image processor for recovering holographic stored data. In one example, a holographic storage system includes a detector for detecting a holographically stored image, wherein the detector oversamples the stored image at a sample rate, and a decoder for processing the detected image, the decoder configured to determine pixel values associated with the source image from the detected image by converting the sample rate.

The present invention is better understood upon consideration of the detailed description below in conjunction with the accompanying drawings and claims.

BRIEF DESCRIPTION OF THE DRAWINGS

FIG. 4 illustrates an exemplary correlation table to locate a registration mark in the detected image;

DETAILED DESCRIPTION OF SEVERAL EMBODIMENTS

Figure 1A:
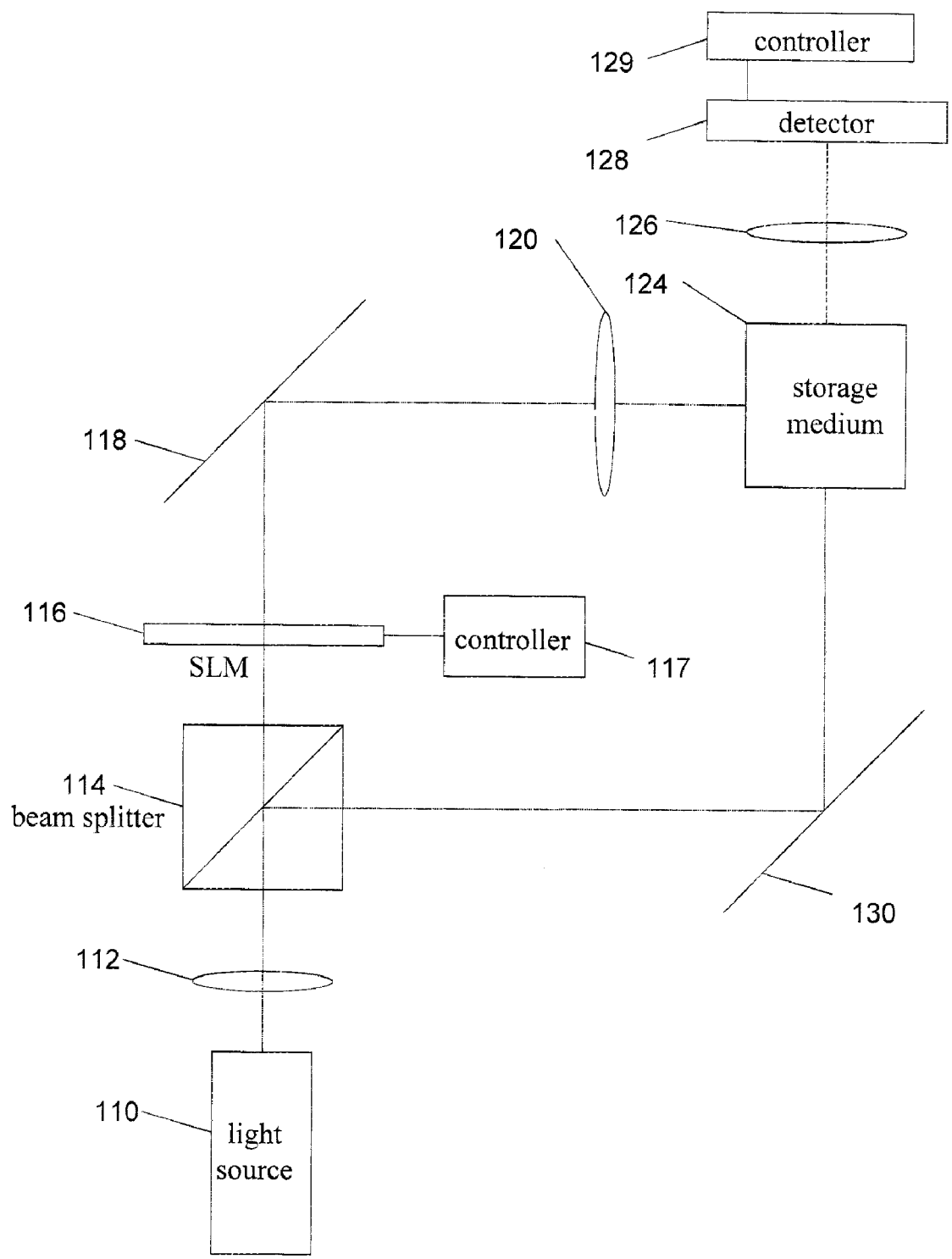
FIGS. 1A and 1B illustrate an exemplary holographic data storage system and an array of addressable elements.

Exemplary methods and systems are provided for holographic data recovery by oversampling. The following description is presented to enable any person skilled in the art to make and use the invention. Descriptions of specific techniques and applications are provided only as examples. Various modifications to the examples described herein will be readily apparent to those skilled in the art, and the general principles defined herein may be applied to other examples and applications without departing from the spirit and scope of the invention. Thus, the present invention is not intended to be limited to the examples described and shown, but is to be accorded the widest scope consistent with the principles and features disclosed herein.

In a holographic data storage system, the SLM is typically aligned with the detector (or camera) such that each pixel on the SLM is projected onto a single pixel on the detector. This alignment is important for a single hologram or a group of holograms stored by various multiplexing methods including, for example, angle, shift, wavelength, correlation, spatial, aperture, phase code multiplexing, and the like. Further, during a read operation, the medium is aligned such that holograms recorded in the storage medium are read out with each bit of the hologram image projected onto a single pixel on the detector. These alignment processes are generally referred to as "pixel matching." Generally, the objective of "pixel matching" is to obtain recovered images of data-containing holograms on the detector that have a low bit error rate (BER). Pixel misalignment may occur because one or more components of the holographic storage system are translated or rotated causing translational, tilted, rotational, magnification, or defocusing errors in the detected image. Misalignment, unless otherwise indicated, may refer to one or more of translational, tilt, rotational, magnification, or defocusing errors of the detected image.

Methods and systems are therefore described herein for processing a detected image that may include misalignments of the SLM, detector, recorded hologram, and the like that may cause a detected image to be misaligned. The detected image may be corrected to improve the BER and recover the stored holographic data. In one example, the method includes oversampling and sample rate conversion, e.g., a fractional delay filter interpolation, to obtain corrected pixel information. In particular, the holographic data image is magnified at the detector by optical magnification and/or imaging the hologram with relatively smaller and more closely spaced pixels than the image was encoded with to oversample the stored image. The oversampled pixels may be corrected with a fractional delay filter or the like.

Initially, an exemplary holographic storage system is described including an SLM, detector, and storage medium. Various exemplary methods are then described for holographic data recovery from detected images.

I. Exemplary Holographic Storage System

FIG. 1A is a schematic illustration of an exemplary holographic storage system that includes an SLM 116 (or other pattern encoder such as a datamask or the like) and camera or detector array 128. For example, a 1024×820 pixel SLM coupled with a 1280×1024 pixel detector array or the like may be used. Preferably, SLM 116 and detector 128 are of similar size (with the desired oversampling/magnification taken into account) to maximize the efficiency of the components. In one example, the pixel sizes may be identical with optics magnifying the image that reaches detector array 128. In another example, the pixel sizes of the detector may be physically smaller and closer together to effect a magnification and thus oversampling of the stored image at detector 128. Additionally, a combination of both actual magnification and smaller and more closely spaced pixel sizes may be used.

The holographic storage system includes a light source 110, for example, a laser for providing a coherent beam of light. A beam splitter 114 is positioned to split the laser beam into an object beam and a reference beam. The object beam is directed to SLM 116 where it is encoded, for example, by an encoding unit within micro-controller 117. The object beam is encoded with data associated with a data page that creates a two-dimensional image. The signal beam, modulated with the data page image, is then directed to the recording storage material 124 by mirror 118 where it interferes with the reference beam.

Micro-controller 117 may include software and/or hardware capable of encoding data by appropriately addressing the array of addressable elements. Micro-controller 117 may also encode various registration marks or known pixel patterns for determining misalignments, e.g., rotation, translation, and the like of the SLM 116, storage medium 124, or detector 128. Encoding data on SLM 116 and reading various detector array 128 pixels is well known in the art. For example, micro-controller 117 may include a decoder and/or encoder, or the like, and may address the SLM 116 and detector array 128 through firmware commands or the like.

Figure 1B:
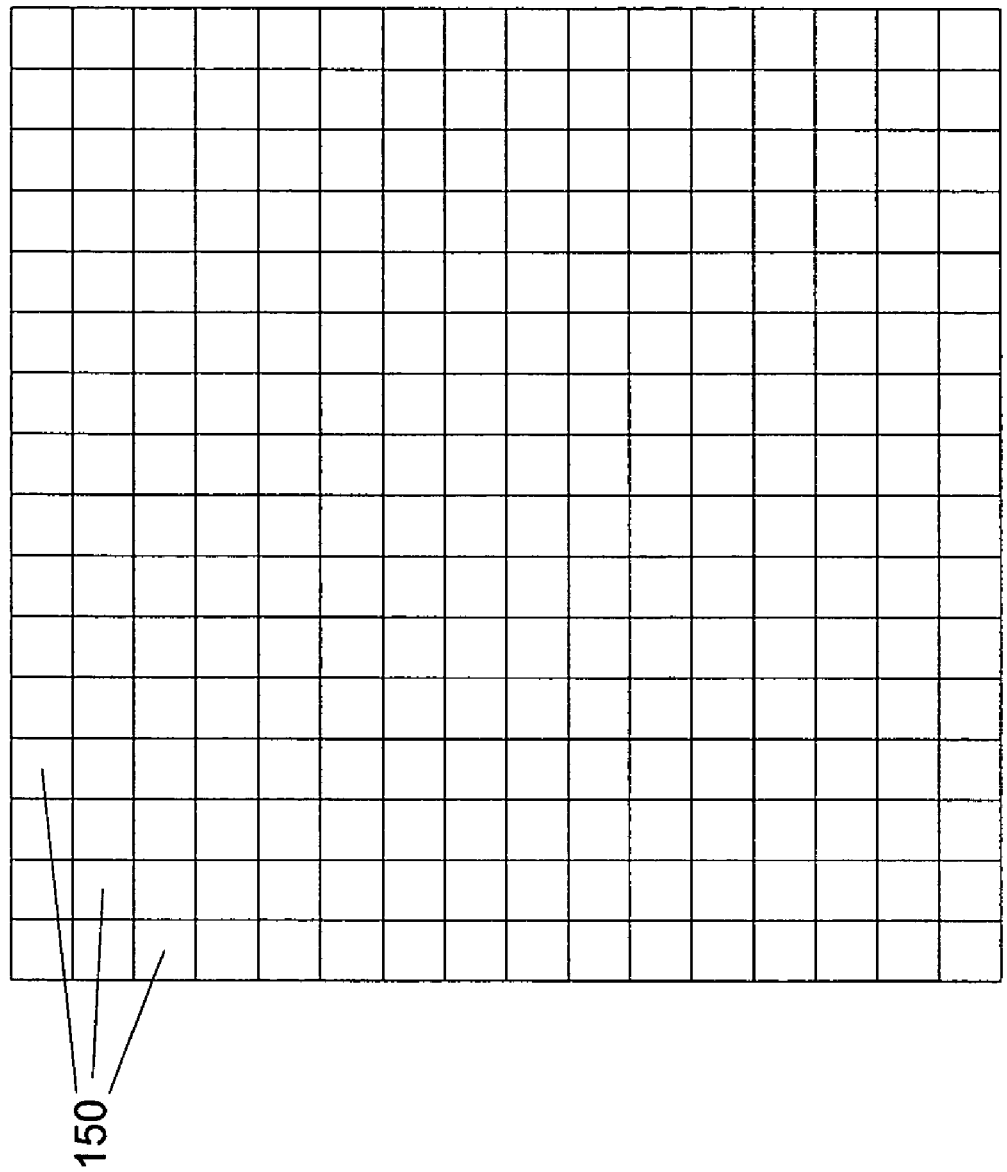

An exemplary array of pixels 150 for SLM 116 or detector array 128 is illustrated in FIG. 1B. Each pixel 150 may include a liquid crystal cell comprising a liquid crystalline material sandwiched between two electrodes and two polarizers that are rotated 90° with respect to each other. In a first state, the liquid crystal cells are transmissive to light by changing the polarization of incident light. In a second state, the liquid crystal cells are non-transmissive by allowing the incident light to pass unchanged. In some configurations, however, the cells are transmissive when allowing the light to pass unchanged and become non-transmissive by changing the polarization of the incident light. By appropriately addressing the array of pixels 150, SLM 116 modulates the object beam into a two-dimensional image or data page comprising an array of pixels 150 that may correspond to binary data units to be stored in the recording medium 124.

It should be recognized that numerous other types of SLMs 116 are possible, including reflective SLMs such as reflective LCD panels and micro-mirror devices. Thus, SLM 116 may be any device capable of optically representing data in two-dimensions. Accordingly, other pattern encoding devices, such as data masks and the like may be included.

The modulated object beam encoded with data is directed towards storage medium 124 where it intersects the reference beam in the recording medium to form a complex interference pattern. The complex interference pattern is recorded in the storage medium 124. After one page of data is recorded, the storage device can be modified to enable additional pages to be recorded in storage medium 124. For example, by modifying the angle and/or wavelength of the reference beam, successive data pages can be recorded in the storage medium 124. Further, storage medium 124 may include a rotating disk of material capable of storing a hologram, where successive data pages, or stacks of data pages, are stored in different sections of the disk as it is rotated.

A particular data page may be retrieved from recording medium 124 with a reference beam similar to the original reference beam used to store the data page. The light is diffracted by storage medium 124 according to the stored hologram and the two-dimensional data page image that was stored in recording medium 124 is directed by lens 126 to photo-detector array 128. Photo-detector array 128 is, for example, an array of charge-coupled devices (CCDs) or a complementary metal-oxide-semiconductor (CMOS) detector array that captures the data page image. Micro-controller 129 receives signals from detector array 128 corresponding to intensity values for each element of the array and may include a decoding unit that decodes the addressable elements of the array according to a specific decoding scheme. The decoded data page may then be read by a computer or the like in a conventional manner.

Other exemplary holographic data storage systems that may be used in conjunction with various aspects of the present invention include those described in U.S. Pat. No. 5,920,536 entitled, "Method and Apparatus for Holographic Data Storage System," U.S. Pat. No. 5,719,691, entitled, "Phase Correlation Multiplex Holography," U.S. Pat. No. 6,191,875 entitled, "Process for Holography Using Reference Beam Having Correlated Phase Content," all of which are incorporated herein by reference in their entirety.

II. Exemplary Methods of Data Recovery

One exemplary method for data recovery of a detected image in a holographic memory system includes oversampling a detected image, e.g., by magnifying the image or detecting the image with a relatively smaller pixel size and closer spacing, and processing the image with a sample rate conversion, e.g., with a fractional delay filter. A fractional delay filter generally converts between two different sampling rates and includes coefficients that may be determined from several known locations or reference marks in the detected image relative to their known location in the stored or source image. The filter output is the pixel information, e.g., value or intensity, of the stored holographic image corrected for magnification and offset. Further processing or decoding of the information, e.g., conversion to soft decision, ECC decoder, and the like, may then be performed.

Figure 2:
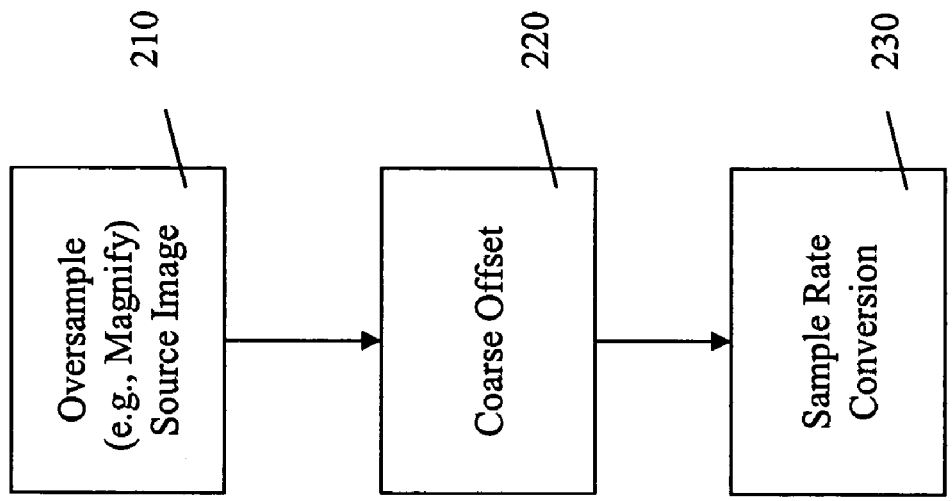
FIG. 2 illustrates an exemplary method for processing a detected image of a stored holographic image.

FIG. 2 illustrates an exemplary process for holographic data recovery. The image is oversampled in block 210 by detecting the image with detector pixel sizes smaller and more closely spaced than the pixel sizes of the image at the source. This may be achieved by magnifying the image through optics, the location of the system components, and the like. In other examples, the detector may include pixels of a physically smaller size and closer spacing than the pattern encoder or stored image (both may be referred to as the "source" image).

For every image received or detected at the detector a coarse misalignment or offset information may be obtained in block 220. In one example, the location of reference marks in the image may be used to determine magnification and misalignment of the detected image. Cross-correlation techniques may be used to search over a restricted region or area of the image, for example, around the expected location of the reference marks. The center of mass of the reference marks may also be determined to get precise, e.g., less than one pixel, offset and magnification information of the detected image relative to the stored image. Other suitable methods, such as synchronization codes and the like may also be used to determine offsets and magnifications of the detected image.

The location of the reference marks, and corresponding magnification and offset information may be used to convert the sampling rate and obtain corrected pixel information in block 230. For example, a transform matrix may be used to obtain transform coefficients to associate the detected pixel information with the source image. The transform coefficients may be used to relate each pixel in the detected image with the source image. Determining the camera coordinates via a perspective transform and using the coordinates to supply a fractional delay filter may decode each detected pixel. In one example, the integer part of the perspective transform coordinates may indicate which samples to supply to the fractional delay filter and the fractional part of the coordinates governs the filter coefficients as described below.

It should be recognized by those skilled in the art that the exemplary methods described herein are suitable with numerous other algorithms and may include additional details for implementation. The exemplary methods described may be performed with a suitable computer or micro-processor associated with a holographic storage system and may be implemented with suitable hardware, firmware, and/or software. Additionally, the methods may be performed off-line when data retrieval is desired.

In general, a pixel-matched system may be viewed or considered as a sampled data system with the information, e.g., pixels, sampled at the critical Nyquist frequency ($f_s/2=B$, where B is the pixel rate). Recovery of the source signal, e.g., the stored pixels, may be viewed as reconstructing the signal from its samples, e.g., detected pixels. Generally, it is not sufficient to sample at the critical frequency to reconstruct; rather, sampling above the critical frequency is typically required ($f_s>2B$). A small amount of (spatial) offset in a pixel matching system may cause the detected image to slip away from the optimum sampling point, which is generally not possible to compensate for. Distortions caused by low sampling rates are generally referred to as "aliasing."

It may be sufficient to sample above the critical frequency by a small amount to recover the source signal, but practically this generally means one must have a very large or robust reconstruction filter to obtain the desired results. Therefore, it is desirable to raise the sampling frequency substantially higher, which allows for a simpler reconstruction filter. The cost of a high sampling rate, however, is reflected in the detector because a larger number of detector pixels are used. A balance between the number of sampled pixels and the complexity of the reconstruction filter is desired.

In a holographic storage system, magnification of the received or detected image serves to increase the sampling rate. Interpolation without magnification is generally insufficient to achieve the desired results since the camera fill factor causes significant loss at offsets approaching ±0.5 pixel; at this extreme, a well-resolved pixel is almost completely concentrated in the space "between" the camera active areas (in this instance, a poorly-resolved pixel may actually be better). Magnification causes the pixel information to appear larger with respect to the camera image pixels and its information is spread out over a wider area. It should be noted that this leads to a cost associated with the exemplary method in terms of the data transfer rate of the detector. The data rate loss is generally $1/M^2$, where M is the linear magnification ratio, since more camera pixels are required for a given number of source image data pixels.

A. Determining Relative Offset

In one exemplary method, information regarding the apparent position and offset of the detected pixels are determined to supply to the fractional delay filter in the form of filter coefficients. Registration marks may be formatted into the source image so that the decoder may easily determine offsets and magnification of the detected image. The registration marks preferable include enough information to account for all expected distortions. Generally, higher-order optical distortions will require more registration marks. Additionally, other suitable methods for determining offset and/or magnification may be used, for example, modulation codes that incorporate timing information adapted to special considerations of a 2-dimensional signal space.

Figure 3:
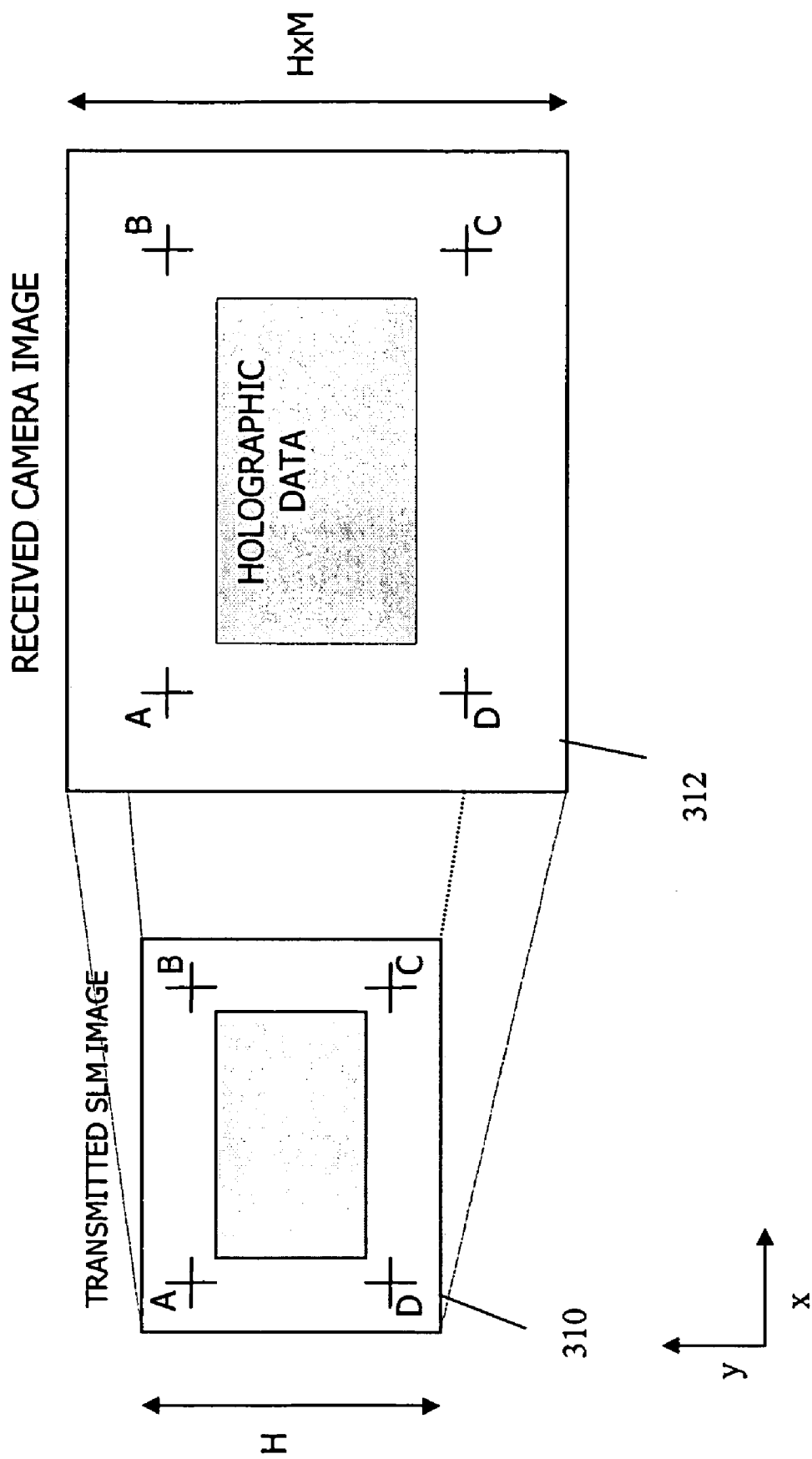
FIG. 3 illustrates an exemplary stored holographic image and magnified detected holographic image.

The following description includes an exemplary image decode operation in greater detail. FIG. 3 illustrates a transmitted source image 310 and a magnified and offset received image 312 detected by a camera or detector array. The received image 312 is a magnified and shifted image of source image 310. The magnification may be represented by factor M, such that source image 310 height H is magnified to receive image 312 height H×M, and source image width W is magnified to receive image width W×M. Received image 312 will occupy a pixel area of H×W×M² resulting in an area loss or penalty of $M^2$, i.e., a data transfer rate loss in the system. For this reason it is generally desired to keep M low, for example, close to 1.0 (filter characteristics place constraints on M however, as discussed below). In one example, M is between 1.0 and 1.5, and preferably between 1.2 and 1.3. Depending on the particular application, however, it is contemplated that M may be larger than 1.5.

Note that locations of the references marks in the source image are known in advance; this information is used to determine relative offsets and magnification. In this example, reference marks A, B, C, D include a 5×5 "crosshair" pattern, illustrated as "+." Various other patterns or reference marks may be used as will be recognized by those skilled in the art. Other registrations marks, such as reserve blocks having known pixel patterns, locater boxes having solid 1's and 0's,
and the like may also be used. Various suitable examples are described in U.S. patent application Ser. No. 10/305,769 entitled "Micro-Positioning Movement of Holographic Data Storage System Components," filed on Nov. 27, 2002, which is hereby incorporated by reference in its entirety.

The location of the reference mark locations may be found by numerous techniques known in the art, for example, by cross correlation. The following is described for illustrative purposes as one method, but various other methods are possible and contemplated depending on the particular application and system.

In one exemplary cross-correlation technique a crosshair pattern, e.g., A, B, C, and D, is located in the image at each corner:

$$\begin{matrix} 0 & 0 & 1 & 0 & 0 \\ 0 & 0 & 1 & 0 & 0 \\ 1 & 1 & 1 & 1 & 1 \\ 0 & 0 & 1 & 0 & 0 \\ 0 & 0 & 1 & 0 & 0 \end{matrix}$$

where a "0" pixel represents a dark or off pixel, and a "1" pixel represents a bright or on pixel. The DC component may be removed (e.g., subtract the mean value) from the signal to avoid or reduce noise, e.g., to eliminate bias in the position estimate caused by auto-correlation noise. It is convenient to use a bi-polar form where a "−1" pixel is off, and a "+1" pixel is on. The crosshair pattern becomes:

$$\begin{matrix} -1 & -1 & +1 & -1 & -1 \\ -1 & -1 & +1 & -1 & -1 \\ +1 & +1 & +1 & +1 & +1 \\ -1 & -1 & +1 & -1 & -1 \\ -1 & -1 & +1 & -1 & -1 \end{matrix}$$

The decoder may begin to search for the reference pattern in the detected image within an area of 16×16 pixels, for example. Over this predefined search area, a cross-correlation of the expected pattern may be computed with successive 5×5 sets of received image pixels. From each received pixel, subtract the MEAN value of the set of 25 pixels may be subtracted, where:

$$\text{MEAN} = \text{SUM}(5 \times 5 \text{ pixels})/25$$

An intermediate matrix Ixx from the values PIXEL-MEAN can be formed to perform a cross-correlation by multiplying each item of the pattern matrix with the corresponding value from matrix I:

$$\begin{matrix} -I_{00} & -I_{01} & +I_{02} & -I_{03} & -I_{04} \\ -I_{10} & -I_{11} & +I_{12} & -I_{13} & -I_{14} \\ +I_{20} & +I_{21} & +I_{22} & +I_{23} & +I_{24} \\ -I_{30} & -I_{31} & +I_{32} & -I_{33} & -I_{34} \\ -I_{40} & -I_{41} & +I_{42} & -I_{43} & -I_{44} \end{matrix}$$

These values may be added up as the cross-correlation centered at pixel 122. This process may be repeated over the desired search area. An exemplary search result is illustrated in FIG. 4. In this example, a 16×16 search, over rows 514 ... 529, columns 715 ... 730 of the detected image. After completing the search area, we have a new matrix of cross-correlation values, one value corresponding to each received pixel location in the search area. Each entry in this table is the cross-correlation result centered at the row and column listed. The greatest value in the table, in this instance, 83 at row 522, column 723 is the coarse position of the crosshair pattern in this region of the received image. Each value in the table may be interpreted as a correlation of the reference image with the detected image shifted by $x_0$, $y_0$ pixels. In the absence of noise, a detector image misaligned by $x_0$, $y_0$ pixels from the reference image will produce a maximum-valued correlation peak in the cross correlation function at values $x=x_0$, $y=y_0$. All other values will be smaller according to the Schwartz inequality. The Schwartz inequality is a basic theorem of linear mathematics proving that the correlation between a function and a shifted copy of the function is maximized when the shift is zero.

The center of mass around the registration mark may then be computed to determine more precisely the offset, e.g., a portion of the offset that is less than one pixel. There are two components corresponding to the center of mass, an "x" (column) coordinate and a "y" (row) coordinate. In one example, the 2 nearest neighboring pixels in each dimension x (left and right) and y (above and below):

CENT.$x=((x-1)(C_{x-1,y})+x(C_{x,y-1}+C_{x,y}+C_{x,y+1})+(x+1)(C_{x+1,y}))$/SUM

CENT.$y=((y-1)(C_{x,y-1})+y(C_{x-1,y}+C_{x,y}+C_{x+1,y})+(y+1)(C_{x,y+1}))$/SUM where SUM=sum of center pixel and its 4 neighbors. It should be recognized, of course, that more or fewer neighbor pixels may be used. Continuing with this example:

SUM=42+12+83+48+36=221

CENT.$x$=(722*12+723*(42+83+36)+724*48)/221=723.16

CENT.$y$=(521*42+522*(12+83+48)+523*36)/221=521.97

The registration mark in this example is therefore determined to be at position [y=521.97, x=723.16]. The integer portion of the position (y=521, x=723) is the coarse position information, which will determine the sample in the fractional delay filter (described below), and the fractional portion of the position (y=0.97, x=0.16) may be used to determine the coefficients in the fractional delay filter.

This process may be repeated for all or at least a sufficient number of reference marks in the image to determine the relative offset and magnification information. The magnification of detected image 312 along the top of image 312 in the x-component may be determined as follows:

$M = d(Bx_{camera} - Ax_{camera})/d(Bx_{slm} - Ax_{slm})$

, where d is the distance between registration marks A and B (shown in FIG. 3) as determined by the difference in pixel locations thereof from the camera and SLM image, respectively.

Similar calculations may be made for other portions of the image and axes. It should be noted that the numeric value of the magnification is not necessary; relative magnification positions and offsets values are sufficient.

Generally the minimum number of registration marks is four (one for each corner of the received image) to solve the exemplary perspective transform function. Other transform functions may require fewer known locations in the source and detected image, for example, only three known locations. If optical distortions are relatively severe, more registration marks may be desired. For example, the image may be broken down into smaller rectangular regions, each controlled by a set of position markers at the corners of the region. Each set of 4 marks defines the quadrilateral perspective transform, which is used to compute the source pixel locations. The number of registration marks included in the image may depend, for example, on the desired decoding performance. Generally, enough registration marks are included such that every pixel in the received image can be located (with sufficient precision) by way of the transform matrix.

An exemplary perspective transform may be computed from a determination of the registration marks or other information associated with relative offsets of the detected image. A perspective transform may be determined according to the following matrix.

$$\begin{bmatrix} x_1 & y_1 & 1 & 0 & 0 & 0 & -X_1x_1 & -X_1y_1 \\ 0 & 0 & 0 & x_1 & y_1 & 1 & -Y_1x_1 & -Y_1y_1 \\ x_2 & y_2 & 1 & 0 & 0 & 0 & -X_2x_2 & -X_2y_2 \\ 0 & 0 & 0 & x_2 & y_2 & 1 & -Y_2x_2 & -Y_2y_2 \\ x_3 & y_3 & 1 & 0 & 0 & 0 & -X_3x_3 & -X_3y_3 \\ 0 & 0 & 0 & x_3 & y_3 & 1 & -Y_3x_3 & -Y_3y_3 \\ x_4 & y_4 & 1 & 0 & 0 & 0 & -X_4x_4 & -X_4y_4 \\ 0 & 0 & 0 & x_4 & y_4 & 1 & -Y_4x_4 & -Y_4y_4 \end{bmatrix} \begin{bmatrix} a \\ b \\ c \\ d \\ e \\ f \\ g \\ h \end{bmatrix} = \begin{bmatrix} X_1 \\ Y_1 \\ X_2 \\ Y_2 \\ X_3 \\ Y_3 \\ X_4 \\ Y_4 \end{bmatrix}$$

where $X_i, Y_i$ indicate the camera detector plane; $x_i, y_i$ indicate slm source plane; and 1 pixel is represented per point.

Four locations in each coordinate system, i.e., the source image and detected image, are known, $[XY_{1234}][xy_{1234}]$. The four known locations, e.g., registration marks A, B, C, and D of image 310, may be determined by any suitable method, e.g., encoded page format (constants):

A $[x_1, y_1]$
B $[x_2, y_2]$
C $[x_3, y_3]$
D $[x_4, y_4]$

The four registration marks detected in image 312 may be determined by any suitable method, e.g., by cross-correlation and center-of-mass calculations as discussed above:

A $[X_1, Y_1]$
B $[X_2, Y_2]$
C $[X_3, Y_3]$
D $[X_4, Y_4]$

, where $X_n, Y_n$ include the integer and fractional value.

The matrix may be solved in the table above for coefficient values [abcdefgh] using standard matrix techniques. The coefficient values allow locating the position of any source pixel in the detector coordinates as:

$X = (ax+by+c)/(gx+hy+1)$ $Y = (dx+ey+f)/(gx+hy+1)$

For example, to determine the detected location of a source pixel, e.g., an slm pixel at [y=3,x=2]. The equations may be solved as follows:

$X = (2a+3b+c)/(2g+3h+1)$ $Y = (2d+3e+f)/(2g+3h+1)$

The values may be used in a sample rate conversion or fractional delay filter to convert a detected pixel to the source pixel. For example, the integer portion of the camera coordinates gives coarse position information such as the sample selection, and the fractional portion of the camera coordinates give fractional delay filter coefficients.

It should be recognized by those skilled in the art that there are various techniques to find patterns in a data stream and determine relative offsets, misalignments, and the like that do not require specific operations such as cross-correlation, solving a matrix, or perspective transform as described above. These are merely described as exemplary methods for carrying out one example.

For example, around the image data region, data may be formatted with synchronization patterns similar to that used by disk and tape drive systems:

```
1 1 0 0 1 1 0 0 1 1 0 0 1 1 0 0 1 1
1 0 0 0 0 0 0 0 0 0 0 0 0 0 0 0 0 1
0 0       x           x   x       0 0
0 0   x               x   x       0 0
1 0       x       x               0 1
1 0           x                   0 1
0 0       x                   x 0 0
0 0   x               x           0 0
1 0 0 0 0 0 0 0 0 0 0 0 0 0 0 0 0 1
1 1 0 0 1 1 0 0 1 1 0 0 1 1 0 0 1 1
```

The bolded border includes synchronization patterns that may be used to determine relative offsets, and the interior "x's" are the formatted data. At the start of decode, a search for these patterns may be made and to derive the correction information with a more robust method (e.g., disk and tape systems often use phase-locked loops) such as RW-DVD format or the like. Exemplary methods are described in U.S. Pat. No. 5,251,313 entitled "Method of Bit Rate Adaptation Using the ECMA 102 Protocol," and "ECMA International—Standardizing Information and Communication System, Standard ECMA-337," December 2002, both of which are incorporated herein by reference in their entirety.

In some examples, similar data patterns may be interleaved within the data as well as surrounding it. For example:

```
1 1 0 0 1 1 0 0 1 1 0 0 1 1 0 0 1 1
1 0 0 0 0 0 0 0 0 0 0 0 0 0 0 0 0 1
0 0       x                       0 0
0 0               x               0 0
1 1 0 0 1 1 0 0 1 1 0 0 1 1 0 0 1 1
1 0   x               x           0 1
0 0               x               0 0
0 0       x                   x 0 0
1 0 0 0 0 0 0 0 0 0 0 0 0 0 0 0 0 1
1 1 0 0 1 1 0 0 1 1 0 0 1 1 0 0 1 1
```

Where this example includes an embedded horizontal synchronous line of information in addition to the border region.

Another possibility is to format the data itself such that it carries offset restoration information, for example, with a modulation code or the like. An exemplary code is described in "Efficient Coding for a Two-Dimensional Runlength-Limited Constraint," R. Roth, P. Seigel, J. Wolf, which is hereby incorporated by reference in its entirety.

It should be understood, however, that the particular method of determining the offset and magnification is not crucial to the filtering method. For example, the rate conversion or filter does not depend on how the correction information was determined.

B. Sample Rate Conversion/Fractional Delay Filter Interpolation

Figure 5:
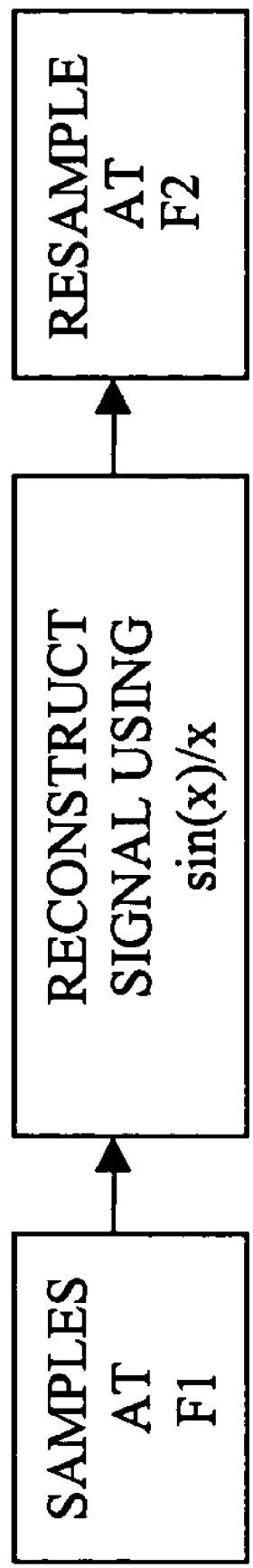
FIG. 5 illustrates an exemplary relationship between two sampling rates.

FIG. 5 illustrates an exemplary method for transforming a set of samples at one sampling rate F1 to another set at a different sampling rate F2. Transforming a magnified and offset detected image to its original coordinates may be solved by a sample rate conversion. In one example, a fractional delay filter is utilized to do this by reconstructing the signal with a function relating the two sampling rates, e.g., $\sin(x)/x$. Converting from sample rate F1 to sample rate F2, and correcting offsets via fractional delay filtering may be considered the digital equivalent of changing the magnification and aligning the image so that it is suitable for holographic data recovery.

It should be noted and recognized by those skilled in the art that various multi-rate signal processing techniques may be used to convert from a first sample rate to a second sample rate. Other terms for similar multi-rate signal processing filters include but are not limited to "fractional delay," "band-limited interpolator," and "continuously variable digital delay."

For holographic data recovery by fractional delay filtering, it is desired to determine the value of a detected pixel at location Xs, Ys (i.e., the location at the source). In one example, the camera location is determined relative to the source location based on a perspective transform such that: CAMERA LOCATION [Xc,Yc]=PERSPECTIVE TRANSFORM [Xs,Ys].

Camera samples centered around the coarse positions [Xc, Yc], which are the integer parts of the transformed coordinates, are presented to the fractional delay filter. The fractional part of the transformed coordinates are used as the filter delay coefficient. The result or output of the filter is the desired pixel value or intensity of the received pixel that should have been detected from the source image without shift, magnification, oversampling, or the like. The intensities may then be passed on for further processing, e.g., conversion to soft-decision, threshold detection, and the like.

Figure 6:
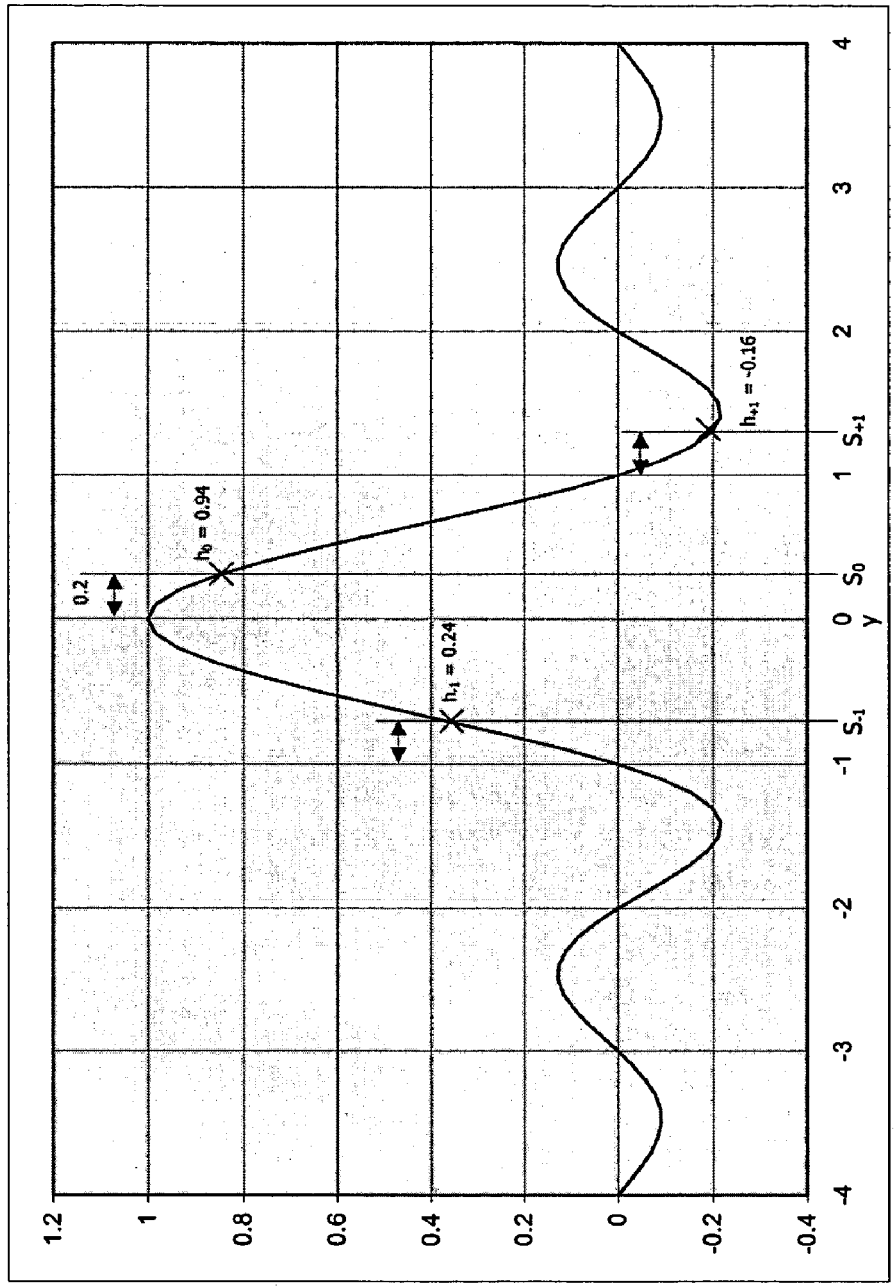
FIG. 6 illustrates an exemplary function used by a fractional delay filter.

In one example, the perspective transform might produce camera pixel location X=10.1, Y=20.2. The filter will use x (column) pixel coordinates 9,10,11, and y (row) pixel coordinates 19,20,21:

CAMERA PIXELS C[col,row]
C[9,20]
C[10,20]
C[11,20]
=>FRACTIONAL FILTER 'X' INPUT PIXELS
0.1=>FRACTIONAL FILTER 'X' COEFFICIENT
C[10,19]
C[10,20]
C[10,21]
=>FRACTIONAL FILTER 'Y' INPUT PIXELS
0.2=>FRACTIONAL FILTER 'Y' COEFFICIENT To reconstruct a signal y(t) from its samples S(k), the Shannon formula may be used:

$$y(t)=\Sigma S(k)\sin \pi(k-t)/\pi(k-t)$$

where S(k) is a sample set at sequence number=k, and y(t) is a reconstructed continuous function at time=t. An example of a $\sin(x)/x$ filter used by a fractional delay filter is illustrated in FIG. 6. In this example, a filter length of 3 is used and a fractional delay offset of −0.2. Coefficients of the fractional delay filter are indicated on the graph by an "X."

$h_{-1}$=+0.24

$h_0$=+0.94

$h_{+1} = -0.16$ $y = h_{-1}S_{-1} + h_0S_0 + h_{+1}S_{+1} = 0.24S_{-1} + 0.94S_0 - 0.16S_{+1}$ where $h_i$ are the coefficients, $S_i$ are the sampled data values, and y is the value of the original sampled signal, shifted by a fraction (−0.2) of one sample period. Continuing with the above example, and using arbitrary sample values $S_{-1}=C[10,19]=100$, $S_0=C[10,20]=105$, $S_{+1}=C[10,21]=110$, y pixel coordinate is converted to a value of 0.24*100+0.94*105−0.16*110=105.1. This is the value determined by the filter for the pixel centered at X=10.1, Y=20.2.

Subsequent decoders may be included to convert these values into bits of information. For example soft decision decoding, where the likelihood of a 1 or 0 is determined, may be included as well as equalization techniques and the like. An ECC decode may then process the soft decision decoding information to determine the bits in the source image. The stored data may then be extracted by various methods known in the art.

Figure 7A:
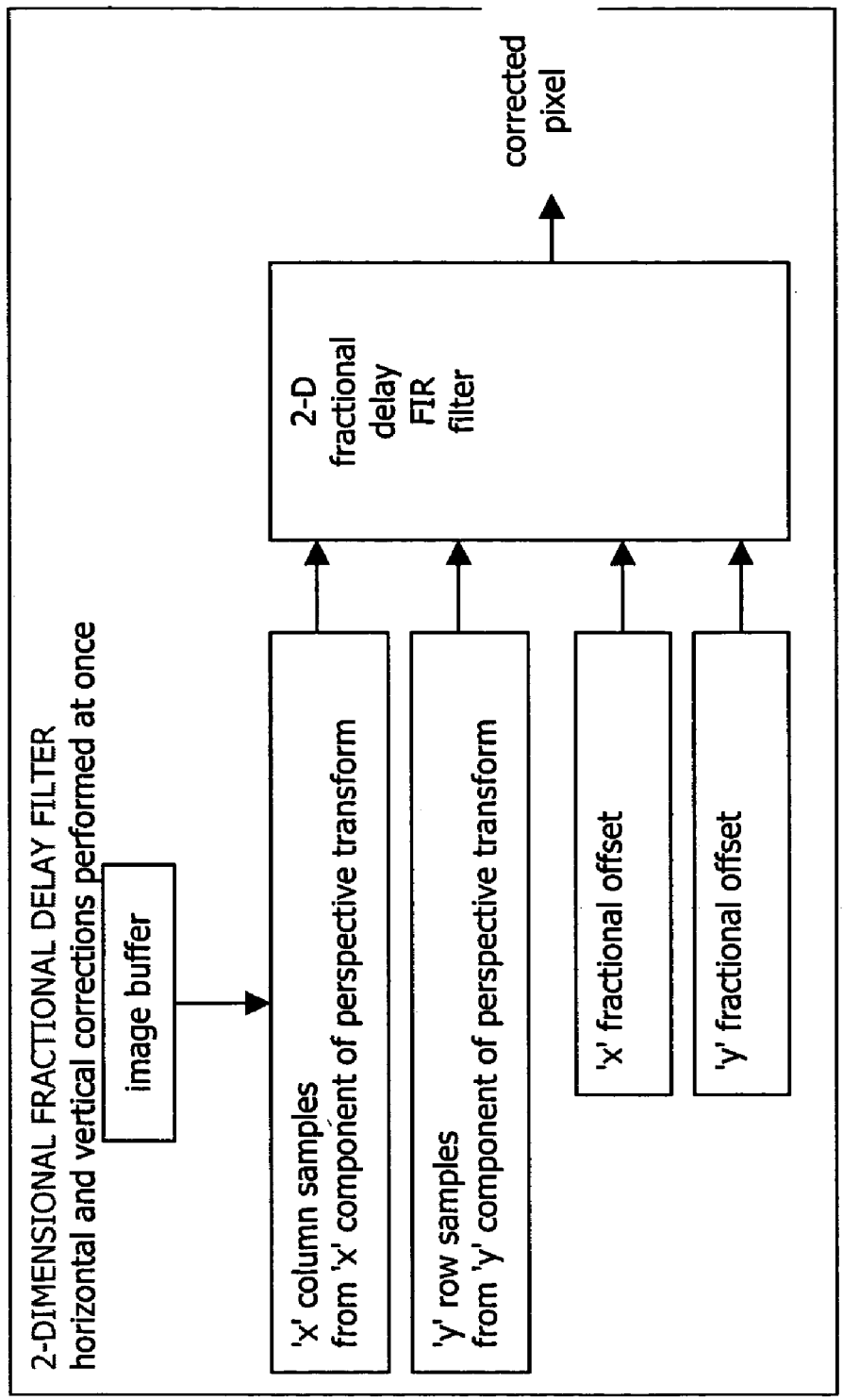
FIGS. 7A and 7B illustrate exemplary fractional delay filter operations.
Figure 7B:
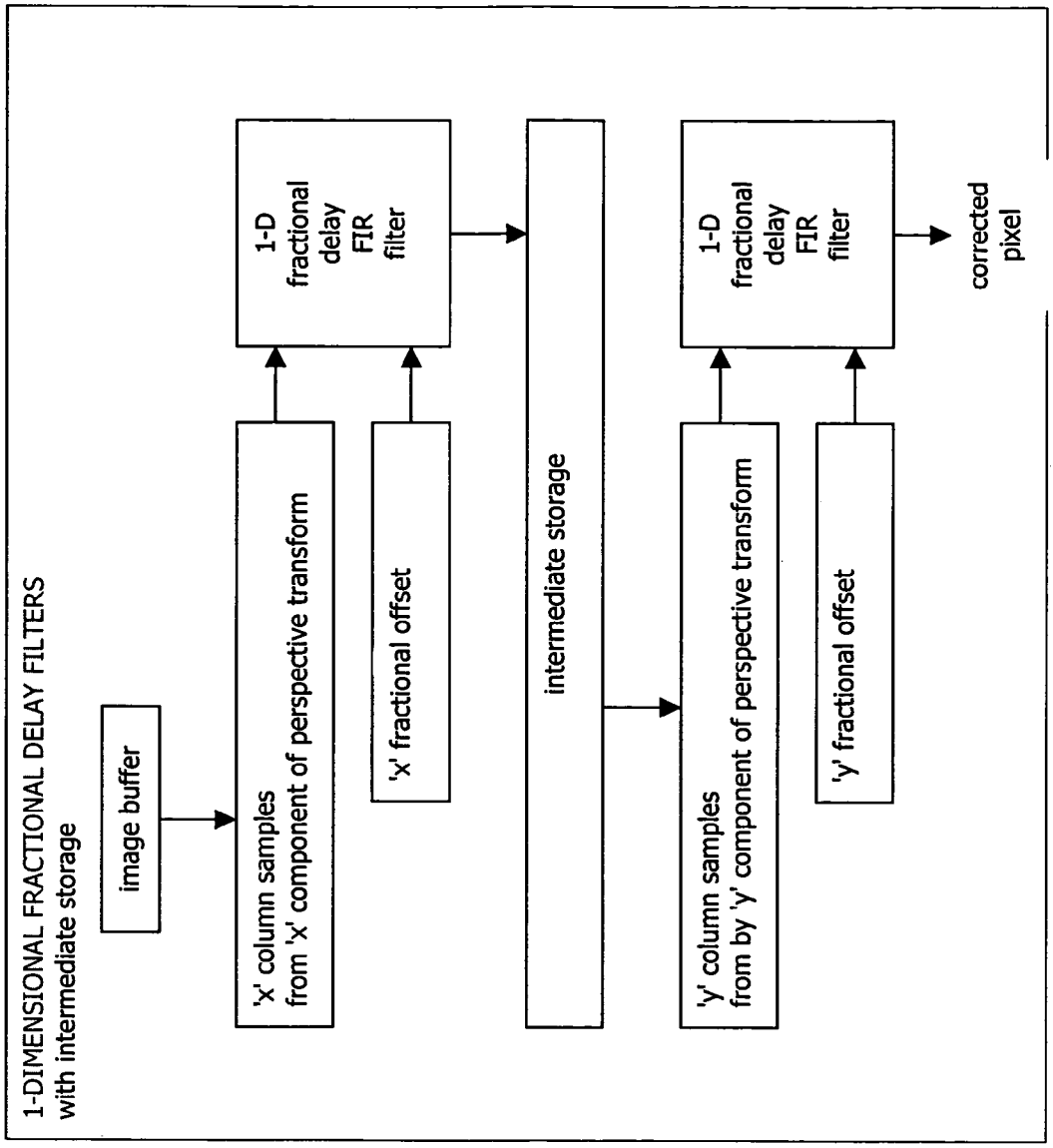

FIGS. 7A and 7B illustrate block diagrams of exemplary rate conversion operations using fraction delay filters. As shown, there may be a separate filter for "X" and "Y" components or it is possible to combine these into a single operation that gives equivalent results. As illustrated in FIG. 7A, pixel information of the detected image is received from an image buffer. The system determines x component samples from an x component perspective transform and determines y component samples from a y component perspective transform in parallel. Further, the x and y fractional offsets are determined in parallel and input to the 2-D fractional delay Finite Impulse Response (FIR) filter. The FIR filter outputs the corrected pixel information. The FIR filter may include one as described in U.S. Pat. No. 4,866,647 entitled "Continuously Variable Digital Delay Circuit," which is hereby incorporated by reference in its entirety, as well as other suitable hardware and/or software, e.g., micro-controller, Digital Signal Processing (DSP), programmable logic device, ASIC, or the like.

FIG. 7B illustrates an exemplary system with 1-D fractional delay filters. The operation is similar to FIG. 7A, except that x component and y component samples and fractional offsets are determined and filtered in series. The corrected pixel output of the system, however, will be the same as the 2-D example.

As will be recognized by those skilled in the art, there are several practical hardware and/or software filter implementations that may be used. For example, a hardware implementation is described in U.S. Pat. No. 4,866,647, entitled "Continuously Variable Digital Delay Circuit," which is hereby incorporated by reference in its entirety. Another exemplary implementation is described in "On Fractional Delay FIR Filters and Their Design," H. Johansson and P. Lowenborg, *Proc. European Conf. Circuit Theory Design*, Espoo, Finland, Aug. 28-31, 2001, which is hereby incorporated by reference in its entirety.

In one example, a fractional delay filter uses a filter of length=3. The filter length is desirably between 3 and 9 depending on the particular application and desired filter complexity. The number of samples involved is the same as the number of filter taps in the fractional delay filter. In theory, an infinite number of samples may be used, however, in practice it is generally desirable to have only a few.

In general, the magnification of the detected image may approach 1.0 (from greater than 1.0) if the filter length is allowed to grow (infinite number of taps), but this is generally impractical. Fewer filter taps are generally desired so the circuit can be realized by commonly available hardware and/or software implementations. Fewer filter taps may also produce a faster filter, and conversely, more taps may slow the filter and subsequent decoding processes.

It should be noted that the filter length and the magnification are related: generally, more magnification will allow a shorter filter, and conversely a longer filter allows less magnification. An engineering or design tradeoff may be made depending on the particular application and the like. Note that the magnification in this instance affects reading only, e.g., different reading machines could have different magnification/filter configurations, and in fact the reader could be designed long after the holographic data has been written into the medium.

Figure 8A:
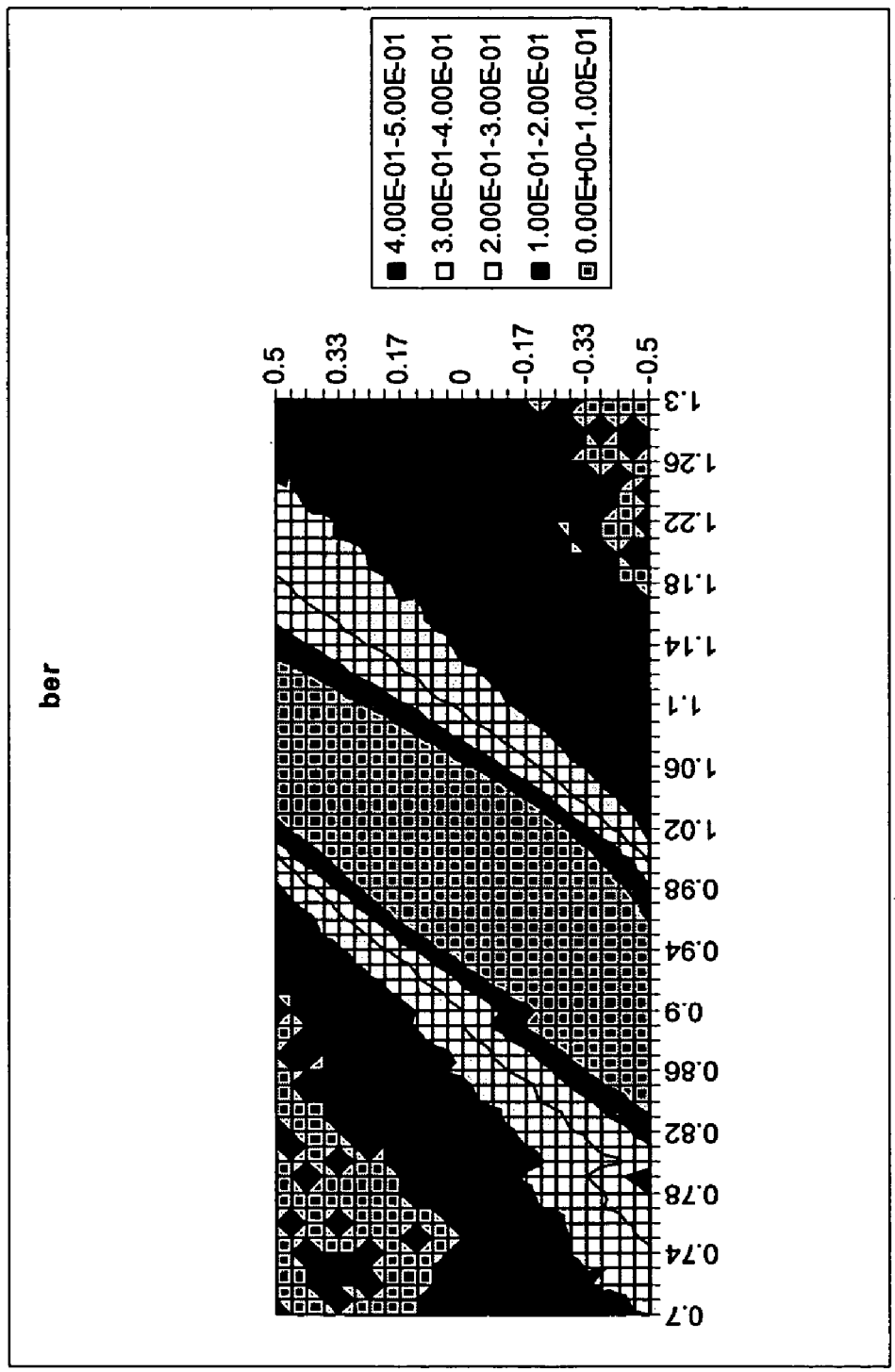
FIGS. 8A and 8B illustrate exemplary simulations of oversampling and fractional delay filtering a detected image.
Figure 8B:
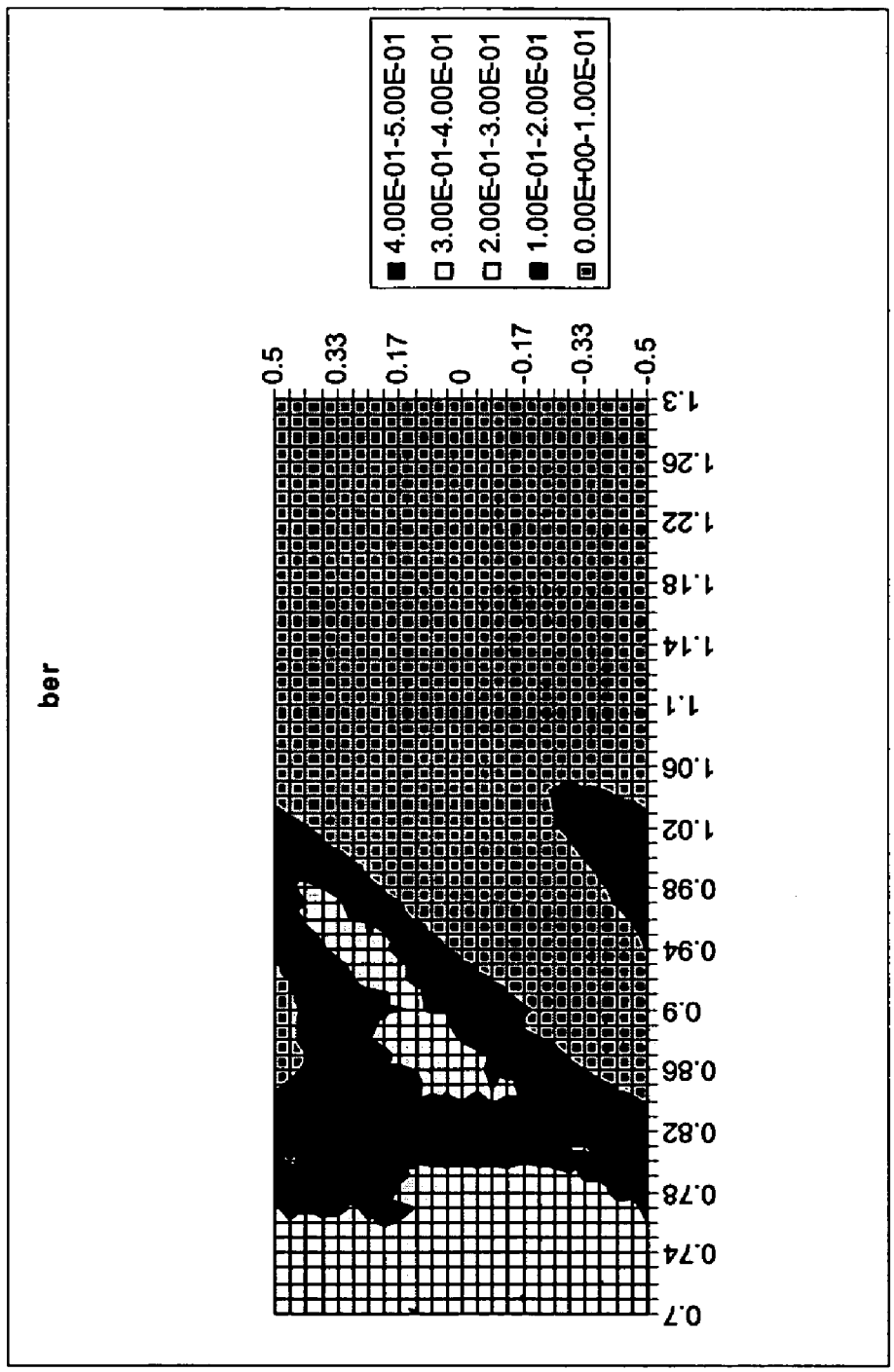

FIGS. 8A and 8B illustrate the contours of BER of a 10×10 simulated holographic data page with 40% camera fill factor. The magnification ranges from 70% to 130% (along the horizontal axis) and the camera pixel offset ranges from −0.5 to +0.5 (along the vertical axis). FIG. 8A shows the case where no correction is performed; the oval-shaped diagonal area around the center is the region where a pixel-matched system would normally operate, e.g., with a magnification of 1.0. As can be seen, when the camera offset approaches −0.5, the BER rises to relatively high levels. This level of offset and consequent error rate is not unlikely in a typical holographic system.

FIG. 8B illustrates the same data set simulated with a correction performed using fractional-delay resampling. At magnification of approximately 1.0 there are still pixel offsets with high BER. As magnification is increased (to the right), however, the BER drops for all offset values. By choosing a suitable operating point above a magnification of approximately 1.0 and allowing the offset to range over all possible values, one may digitally restore the received signal to M=1.0 and offset=0.0 using the exemplary methods described.

The above detailed description is provided to illustrate exemplary embodiments and is not intended to be limiting. It will be apparent to those skilled in the art that numerous modification and variations within the scope of the present invention are possible. For example, various methods of detecting alignment and/or correcting for misalignment described herein may be used in holographic storage systems in isolation or in combination with any other methods. Additionally, the apparatus and methods described herein should not be limited to any particular holographic storage system, for example, the apparatus and methods are equally applicable to read only holographic systems as well as read/write holographic systems. Additionally, particular examples have been discussed and how these examples are thought to address certain disadvantages in related art. This discussion is not meant, however, to restrict the various examples to methods and/or systems that actually address or solve the disadvantages. Accordingly, the present invention is defined by the appended claims and should not be limited by the description herein.

The invention claimed is:

1. A method for holographic data recovery, comprising:
   a) detecting an image of a source image, wherein the detected image is oversampled;
   b) determining a relationship between a detected pixel location and a source image location; and
   c) obtaining pixel information associated with the source image from the detected image based on a spatial fractional delay filter, the spatial fractional delay filter outputting fractionally delayed values, filtering two-dimensionally, and converting between two different sampling rates based on the determined relationship between the detected pixel location and the source image location, wherein a relative pixel size between the source image and the detector image is between 1.1 and 1.5.

2. The method of claim 1, wherein the image is oversampled by magnifying the source image relative to the detector.

3. The method of claim 1, wherein the image is oversampled by detecting the image with a pixel size and spacing relatively smaller than the source image.

4. The method of claim 1, further including determining a relative shift in the detected image.

5. The method of claim 1, further including determining a relative magnification in the detected image.

6. The method of claim 1, wherein b) includes locating the position of a plurality of registration marks to determine a relative offset of the detected image.

7. The method of claim 1, wherein b) includes using a perspective transform matrix to associate a detected pixel location with a source image location.

8. The method of claim 1, wherein the pixel information includes the pixel value.

9. The method of claim 8, wherein the pixel value includes the intensity of the pixel associated with the source image.

10. The method of claim 1, wherein the relative pixel size between the source image and the detector image is between 1.2 and 1.3.

11. A method for holographic data recovery, comprising:
a) detecting an image of a source image, wherein the detected image is oversampled at a sample rate; and
b) obtaining pixel values associated with the source image from the detected image by converting the sample rate, wherein converting comprises a spatial fractional delay two-dimensionally filtering the sample rate to a second rate, the fractional delay filtering outputting fractionally delayed values, wherein a relative pixel size between the source image and the detector image is between 1.1 and 1.5.

12. The method of claim 11, wherein b) includes determining a coarse pixel location in the detected image, and determining a shift from the coarse pixel location in the detected image relative to the source image.

13. The method of claim 11, wherein b) includes determining a coarse pixel location in the detected image, determining a fractional shift from the coarse pixel location, applying a weighted function that weights detected pixel values in the vicinity of the coarse pixel location according to their proximity to a fine pixel location determined by the fractional shift, and combining the weighted values to produce a pixel value associated with the source image.

14. The method of claim 11, further including determining a relationship between a pixel of the detected image and a pixel of the source image.

15. The method of claim 11, wherein the image is oversampled by magnifying the source image relative to the detector.

16. The method of claim 11, wherein the image is oversampled by detecting the image with a pixel size relatively smaller and more closely spaced than the source image.

17. The method of claim 11, further including determining a relative shift in the detected image.

18. The method of claim 11, further including determining a relative magnification in the detected image.

19. The method of claim 11, wherein the relative pixel size between the source image and the detector image is between 1.2 and 1.3.

20. A holographic storage system, comprising:
a detector for detecting a holographically stored image, wherein the detector oversamples the stored image;
a decoder for processing the detected image, the decoder configured to determine a relationship between a location on the detector and a location of the source image, and fractional delay filtering the detected image, the fractional delay filtering two-dimensionally and converting between two different sampling rates based on the determined relationship between the detected pixel location and the source image location, the fractional delay filtering outputting fractionally delayed values, wherein a relative pixel size between the source image and the detector image is between 1.1 and 1.5.

21. The system of claim 20, wherein the stored image is magnified to the detector.

22. The system of claim 20, wherein detector includes a pixel size and spacing relatively smaller than the stored image.

23. The system of claim 20, wherein the decoder further locates the position of a plurality of registration marks in the stored image to determine a relative offset of the detected image.

24. The system of claim 20, wherein the decoder further includes using a perspective transform matrix to associate a detected pixel location with the stored image location.

25. A holographic storage system, comprising:
a detector for detecting a holographically stored image, wherein the detector oversamples the stored image at a sample rate;
a decoder for processing the detected image, the decoder configured to determine pixel values associated with the source image from the detected image by converting the sample rate wherein a fractional delay filter operates to output fractionally delayed values, filter two-dimensionally, and convert the sample rate to a second rate, wherein a relative pixel size between the source image and the detector image is between 1.1 and 1.5.

26. The system of claim 25, wherein the decoder is further configured to: determine a coarse pixel location in the detected image, determine a fractional shift from the coarse pixel location, apply a weighted function that weights detected pixel values in the vicinity of the coarse pixel location according to their proximity to a fine pixel location determined by the fractional shift, and combine the weighted values to produce a pixel value associated with the source image.

27. The system of claim 25, wherein the decoder is further configured to determine a coarse pixel location in the detected stored image, and determine a shift from the coarse pixel location in the detected stored image to the stored image.

28. The system of claim 25, wherein the stored image is magnified to the detector.

29. The system of claim 25, wherein detector includes a pixel size and spacing relatively smaller than the stored image.

30. The system of claim 25, wherein the decoder further locates the position of a plurality of registration marks in the stored image to determine a relative offset of the detected image.

* * * * *